July 27, 1965   R. G. RAKESTRAW   3,196,580
TOY VEHICLE HAVING RESILIENT SUPPORTS AND
SELF-CONTAINED DRIVE MEANS
Filed May 1, 1962   2 Sheets-Sheet 1
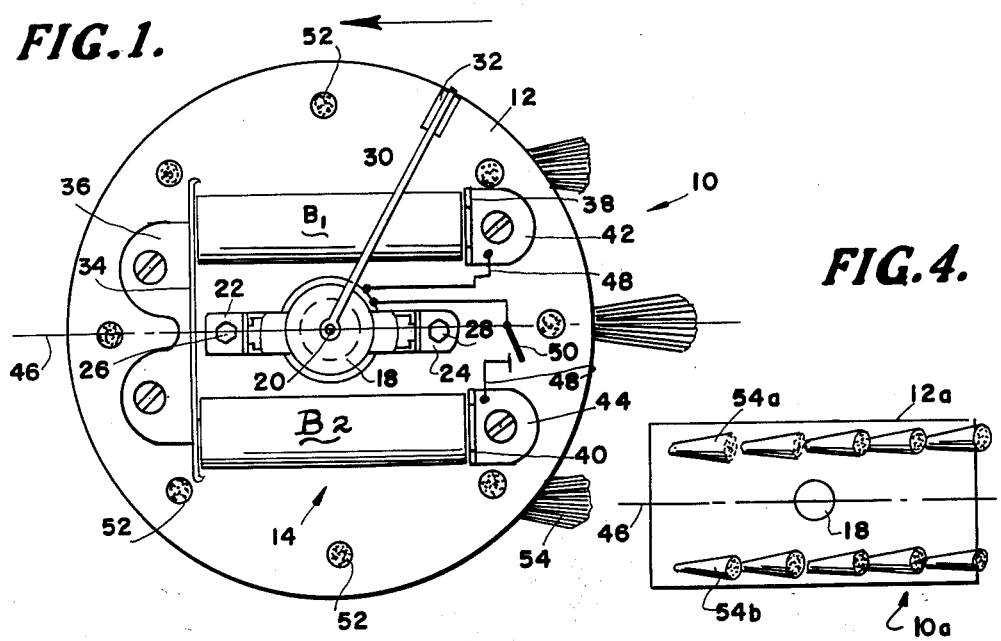
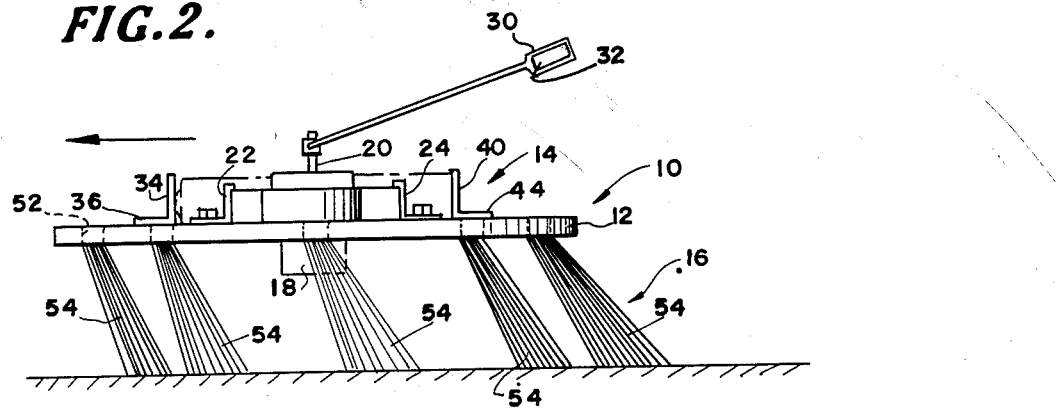
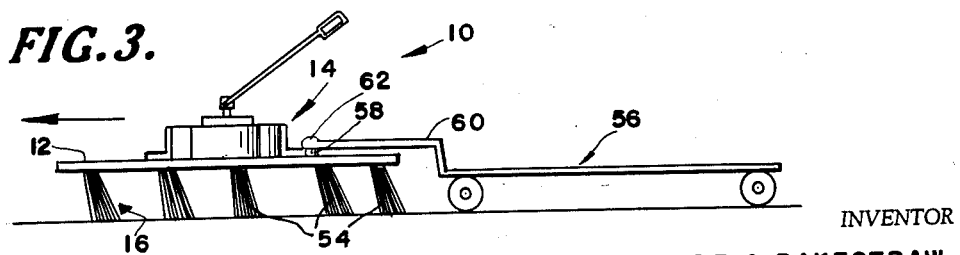
INVENTOR
ROBERT G. RAKESTRAW
BY Cushman, Darby & Cushman
ATTORNEYS

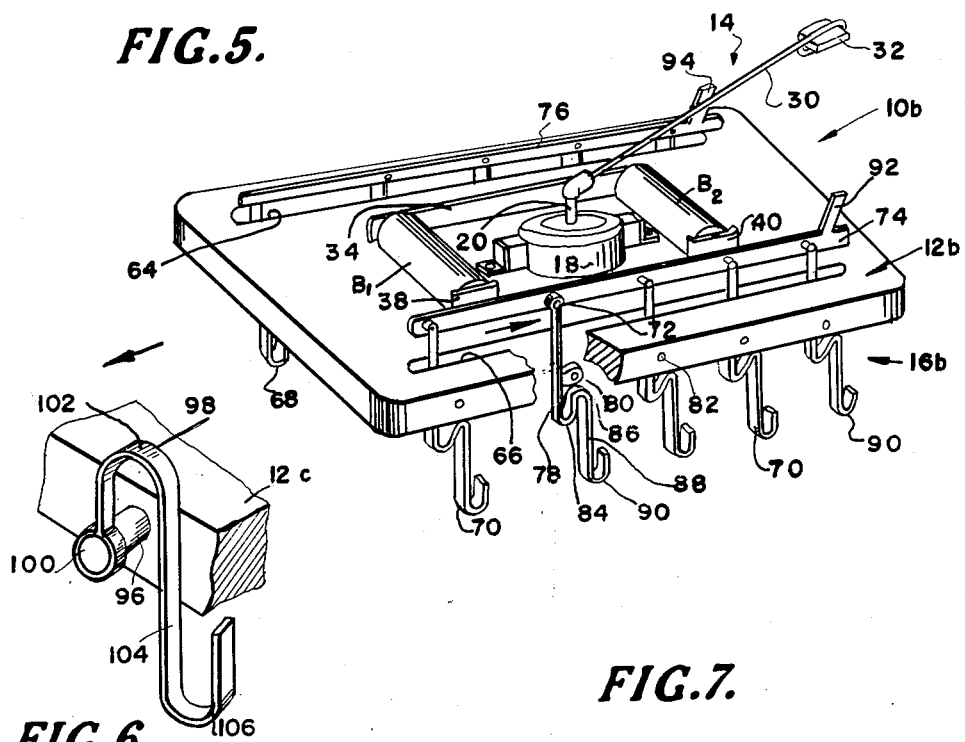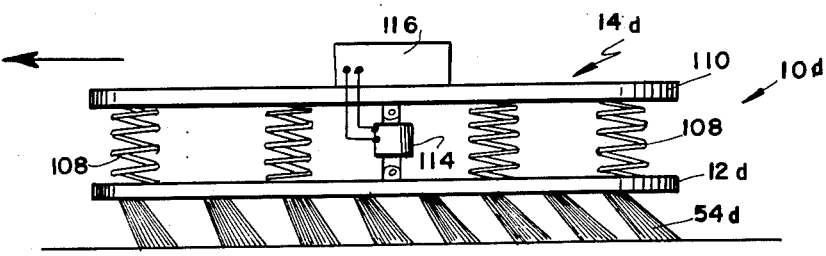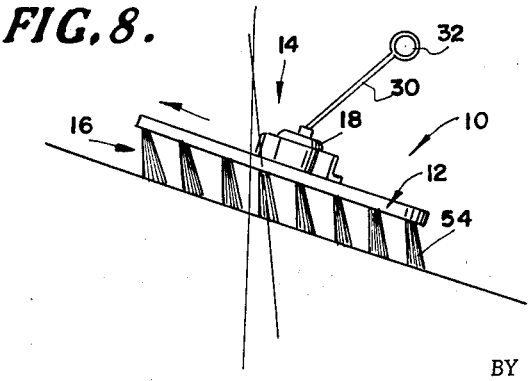

United States Patent Office 3,196,580
Patented July 27, 1965

3,196,580
TOY VEHICLE HAVING RESILIENT SUPPORTS
AND SELF-CONTAINED DRIVE MEANS
Robert G. Rakestraw, 304½ E. 6th St., Rome, Ga.
Filed May 1, 1962, Ser. No. 191,516
12 Claims. (Cl. 46—243)

This invention has reference to a vehicle, preferably of a toy construction, with new and improved means for propelling the vehicle along a supporting surface.

According to this invention there is provided a vehicle which is supported by longitudinally depending resilient elements such as brush bristles or leaf springs, propulsive force being imparted to these resilient elements by a whirling weight carried in driving relationship on the vehicle. This whirling weight imparts a vibratory action on the vehicle, due to the rapid shift of the center of gravity, which vibrations are transferred into a propulsive force through the resilient depending elements. To this end, the depending elements are rearwardly inclined in the opposite direction to vehicle movement. This invention also contemplates means for steering the vehicle by changing the orientation of the resilient elements, as well as varying the axes of the elements from the front to the rear of the vehicle to provide varying movement.

Further objects of this invention include the provision of a vehicle which includes a platform carrying depending resilient elements, as described, together with a self-contained driving means. In the preferred embodiment of this invention, a drive motor, driven by a replaceable energy source such as dry cell batteries, drives an angularly disposed lever arm which is weighted at its free end. Rotation of this weighted lever arm causes the platform to vibrate, this vibration being transformed into a propulsive force through the resilient elements which support the platform.

This invention also contemplates the provision of a vehicular toy: (1) which is of rugged but simple and inexpensive construction; (2) which is highly entertaining due to the novel drive means provided; (3) which is adapted to move up and down inclined surfaces and is operative to be steered in different paths simply by changing the orientation of the resilient elements; and (4) and which includes new and improved means for imparting vibratory motion thereto, and transforming this vibratory motion into a propulsive force.

These and still further objects, advantages and novel features of the present invention will become apparent in the specification and claims, taken in connection with the accompanying drawings.

In the drawings:
FIGURE 1 is a plan view of a toy vehicle according to one embodiment of the invention;
FIGURE 2 is an elevation view of the toy vehicle in FIGURE 1;
FIGURE 3 is a view similar to FIGURE 2, but showing the vehicle towing another;
FIGURE 4 is a bottom plan view of the vehicle, showing a modified construction;
FIGURE 5 is a perspective view of another modified embodiment of this invention;
FIGURE 6 is a partial perspective view of a further embodiment of this invention;
FIGURE 7 is a side elevation view of still another modified embodiment of this invention; and
FIGURE 8 is an elevation view of the vehicle moving up an inclined surface.

Referring now to FIGURES 1 and 2, there is shown a vehicle 10 which includes a circular platform 12 carrying vibratory drive means 14 on its top surface, and supporting means 16 depending from its bottom surface.

The drive means 14 includes a D.C. motor 18 which is mounted with its drive shaft 20 extending vertically upwardly through the center of the platform 12, the motor 18 being secured to the platform 12 by opposed depending lugs 22, 24 carrying screws 26, 28, respectively. An angularly extending lever arm 30 is drivingly joined to the motor drive shaft 20 at its lower end, this lever arm 30 having a weight 32 at its opposite free end.

Power for the D.C. motor 18 is provided by two conventional dry cell batteries $B_1$ and $B_2$. In this regard, an upstanding conductor plate 34 is screwed to the platform 12 at its lower flanged end 36, while similar conductor plates 38 and 40 are positioned in longitudinal alignment with the conductor plate 34. Each of the latter conductor plates are joined to the platform 12 at their respective lower flanged ends 42, 44 in a like manner. Thus, the battery $B_1$ is operative for removable engagement with the conductor plates 34 and 38 on one side of the motor 18, while the other battery $B_2$ is removably engaged with the conductor plates 34 and 40 on the opposite side of the motor 18. The batteries $B_1$ and $B_2$ are positioned in symmetric relationship to the longitudinal axis 46 of the platform 12 and close to the D.C. motor 18 so the weight is evenly distributed. Suitable conductor wires 48 provide an electrical connection from each of the conductor plates 38, 40 to the D.C. motor 18, and an on-off switch 50 is interposed in this electrical circuit for operating D.C. motor 18.

Reference is now made to the construction and arrangement of the supporting means 16 carried by the platform 12. In this regard, the platform 12 has a plurality of apertures 52 therethrough on a concentric circle near the outer periphery thereof. Received in each of these apertures 52 are a group of stiff brush bristles 54 which have an axis extending in a rearward direction, opposite to the direction of movement of the platform 12. These depending groups of bristles 54 support the platform 12, their bottom ends engaging the surface upon which the vehicle 10 moves. During operation of the vehicle 10, FIGURES 1 and 2, the D.C. motor operates to rapidly whirl the lever arm 30 about the axis of the motor drive shaft 20. By virtue of the angular relationship of the lever 30 with respect to the motor drive shaft 20, a vibratory motion is set up in the vehicle 10. This vibratory motion is transmitted to a propulsive force through the bristle groups 54 to move the vehicle 10 in the direction of the arrow. Necessarily, the rearward inclination of the bristle groups 54 is required in order that a component force is created by this vibratory action. The path of the vehicle may be regulated so that the same may move, for example, in a circle simply by positioning the rearward inclination of the bristle groups 54 on one side of the axis 46 less than the other side. Maximum speed is obtained with the axes of the bristle groups nearly vertical. In order to prevent the rear end of the vehicle 10 from drifting while coasting or moving down an inclined surface, the bristle groups 54 at the rear of the vehicle 10 are rearwardly inclined more than the bristle groups at the front of the vehicle 10. For coasting down an inclined surface the bristle groups 54 at the front of the vehicle 10 are inclined in a forward direction.

Referring now to FIGURE 3, vehicle 10 is shown towing a wagon 56. In this regard, the platform 12 carries an upstanding ball 58 near its center where the amplitude of vibration is less than the peripheral ends, the wagon 56 having an extending arm 60 which is removably joined to the platform ball 58 by a socket 62 in the usual fashion. This arrangement in FIGURE 3 thereby provides an entertaining toy by virtue of the varying types of wagon configurations which may be readily designed.

Referring now to FIGURE 4, the platform 12a is shown to be of rectangular configuration, there being opposed bristle groups 54a and 54b on opposite sides of the longitudinal axis 46 of the vehicle 10a. The drive means for the vehicle shown in FIGURE 4 is identical to that shown in FIGURES 1 and 2.

Referring now to FIGURE 5, there is shown still another modified embodiment of this invention, the vehicle 10b having a rectangular platform 12b generally similar to that shown in FIGURE 4. This drive means 14 is the same as that shown in FIGURES 1 and 2 except that the batteries $B_1$ and $B_2$ are positioned closely to the front and rear ends of the motor 18 for convenience. The platform 12b has elongated slots 64 and 66 adjacent the long sides thereof.

The supporting means 16b in this embodiment of the invention includes an arrangement of resilient leaf springs as a substitution for the bristle groups 54, together with means for steering the vehicle 10b by regulating the angular inclination of the spring means with respect to the vertical. To this end, spaced apart leaf springs 68 and 70 are carried within the slots 64 and 66, respectively.

The leaf springs 70 are formed with apertures through their upper ends pivotally receiving lateral pins 72 carried by a slidably mounted rod 74. Likewise, the springs 68 in the opposite side of the platform 12b are pivotally mounted in an identical fashion to a slidable rod 76. The spring construction in this embodiment of the invention includes a first depending portion 78 which carries an apertured lug 80. Pins 82 are carried by the platform 12b and extend through the lugs 80 so that the spring 70 is pivotally mounted with respect thereto.

The spring 70 then merges into a first U-shaped portion 84 thence into a downwardly U-shaped portion 86, forming a second depending leg 88. The bottom end of this second depending leg 88 is likewise of U-shaped configuration so that the vehicle 10b rests upon the U-shaped bottom end 90 of the spring 70. The springs 68 on the opposite side of the platform 12b are of identical construction. The rods 74 and 76 have upstanding handles 92 and 94, respectively, so that the rods may be manually moved forward and backward to regulate the angular inclination of the springs 68 and 70 with respect to the vertical.

Thus, by simply moving one of the rods 74, 76 forward of the other, the vehicle 10b is easily steered in a curved path. To provide a left turn, the springs 70 are rearwardly inclined more than the spring 68. Likewise, the rods 74 and 76 may be retracted rearwardly a considerable distance to reverse the inclination of the springs 68, 70 with respect to the vertical so that the vehicle 10b can move in the opposite direction.

Referring now to FIGURE 6, a rectangular platform 12c is shown with pins 96 extending from the opposite side edges thereof in a fashion generally similar to the arrangement shown in FIGURE 5. In this embodiment of the invention, the leaf springs 98 are fixed to the pins 96 via formed apertures at their lower front end 100, as by a shrink fit. The spring then merges into an inverted U-shaped portion 102 the opposite U-shaped portion merging to an elongated depending leg 104 which, in turn, has a U-shaped bottom end 106 resting upon the surface along which the vehicle will move. This embodiment of the invention thereby incorporates the beneficial feature of a resilient spring with the simplicity of construction of the embodiment shown in FIGURES 1 and 2 wherein the depending elements are constructed with supporting means 16 joined to the platform in fixed relationship.

Referring now to FIGURE 7, there is shown a platform 12d receiving bristles 54d in a manner similar to that in FIGURES 1 and 2. According to this feature of the invention, a drive means 14d is provided which imparts a vibratory motion to the platform 12d but does not utilize the feature of the whirling lever arm 30 (FIGURES 1 and 2). In this embodiment of the invention, the platform 12d carries along its upper surface coil springs 108 which support an auxiliary platform 110 which is heavier than the platform 12d so as to lessen vibrations thereof, as will become apparent.

Carried in pivotal relationship between the platforms 12d and 110 is a central solenoid 114 connected to a self-contained power source 116 conveniently mounted on the auxiliary platform 110. The power source 116 includes means for interrupting the power supply to the solenoid so that the same is activated and deactivated in a rapid fashion to thereby impart a vibratory motion to the vehicle 10d with the aid of the coil springs 108.

Referring now to FIGURE 8, the vehicle is shown moving up an inclined surface. In this regard, the inclination of the bristle group 54 or springs 68 and 70 and the springs 98 are inclined to the vertical so that the forward motion is imparted to the vehicle 10d.

While preferred embodiments of the present invention have been described, numerous alternative arrangements will be apparent to those skilled in the art. In this regard, it is apparent that the drive means 14 may include some other self-contained power source. In the preferred embodiment of this invention wherein the vehicle is utilized as a toy, a spring motor is typical of alternative means for driving the lever arm 30. Likewise, with respect to the whirling arm driving means in FIGURES 1–6, the motor 18 may be positioned at some other point along the platform and the weight may rotate in a plane which is other than horizontal. However, for smoothness, stability and efficient control on various surfaces, the most desirable position of the motor 18 is the geometric center of the platform as illustrated in the various embodiments of this invention.

Likewise, the platform may be utilized to support a simulated vehicle design which would give a pleasing appearance, such as a vehicle, airplane or the like. When such an arrangement is used, depending upon the size of the simulated vehicle, the arm 30 may be located inside or outside the construction.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. Toy vehicle comprising: a platform, a plurality of support elements joined to said platform in depending relationship and spaced from one another near the periphery of said platform, said support elements extending from said platform in an array having at least two materially different directions of extent and said support elements being spaced from one another around a major portion of the periphery of said platform, said support elements being of elongated resilient construction; a self-contained power source operatively carried by said platform and means operatively carried by said platform for imparting a vibratory motion to said platform upon actuation of said power source to thereby transmit a force to a surface upon which said toy vehicle is mounted via said support elements; at least a significant number of said support elements being rearwardly and downwardly directed with respect to the direction in which said force is transmitted, said self-contained power source including a motor, said motor being positioned substantially at the geometric center of said platform, said motor having an output shaft extending vertically therefrom; said means for imparting a vibratory motion to said platform including a lever arm joined to said output shaft in angular relationship to the output shaft, a weight mounted at the outer free end of said lever arm, said lever arm being rotatable about a vertical axis by said motor and output shaft to impart vibratory motion to said platform by a shift in the center of gravity of the toy vehicle caused by rotation of said lever arm and weight, said lever arm being of such length that said weight is successively carried into substantially vertical alignment with at least a majority of the spaced support elements by the rotation of said motor output shaft.

2. Vehicle defined in claim 1 wherein said motor is a D.C. motor, and said power source mounting means includes means for removably connecting a source of electric power to said D.C. motor.

3. Vehicle defined in claim 1 wherein said support elements include grouped bristles joined to the outer region of said platform and rearwardly inclined relative to the direction of travel thereof.

4. Vehicle defined in claim 1 wherein said support elements include leaf springs depending from said platform.

5. Vehicle defined in claim 4 wherein said leaf springs include a first depending leg joined to said platform at one end and merging into an inverted U-shaped portion; the opposite leg of said inverted U-shaped portion constituting a second depending leg, the bottom end of said second depending leg including a U-shaped portion which is operative to rest on a supporting surface.

6. Toy vehicle comprising: a platform; a plurality of inclined support elements joined to said platform in depending relationship, said elements being of elongated resilient construction and providing support for said platform; a self-contained power source operatively carried by said platform and means operatively carried by said platform for imparting a vibratory motion to said platform upon actuation of said power source to thereby transmit a force to a surface upon which said vehicle is mounted via said depending elements; at least a significant number of said support elements being rearwardly and downwardly directed with respect to the direction in which said force is transmitted; and means carried by said platform and operatively joined to said support elements for selectively varying their angle of inclination with respect to the vertical.

7. Vehicle defined in claim 6 wherein said support elements are resilient leaf springs, said leaf springs being disposed in at least two groups, said leaf springs including lug means pivotally connected to said platform intermediate their ends, and said angle-varying means including a rod pivotally connected to the upper ends of each of said groups of leaf springs, whereby longitudinal movement of said rod is operative to pivot said leaf springs about said lug means.

8. Vehicle defined in claim 1 wherein said platform has a front end and a rear end, the support elements at the rear end of said platform being inclined to the vertical at a greater angle than the support elements at the front end thereof.

9. Toy vehicle comprising: a platform; a plurality of inclined support elements joined to said platform in depending relationship, said elements being of elongated resilient construction and providing support for said platform; a self-contained power source operatively carried by said platform and means operatively carried by said platform for imparting a vibratory motion to said platform upon actuation of said power source to thereby transmit a force to a surface upon which said vehicle is mounted via said support elements; said means including a second platform positioned above said first-mentioned platform; coil springs providing support for said second platform; a solenoid connected between said first and second platforms; and electric circuit means providing an interrupted power supply to said solenoid to impart vibrations to said platforms.

10. Vehicle defined in claim 1 wherein said platform includes a plate of generally circular configuration.

11. Vehicle defined in claim 1 wherein said motor is a D.C. motor, and including means for removably mounting at least one dry cell battery to said platform means for driving said D.C. motor.

12. Vehicle defined in claim 1 including a pivot connection in the central region of said platform at a point of low vibration amplitude for operatively receiving a second vehicle in towed relationship.

References Cited by the Examiner

UNITED STATES PATENTS

| 966,761 | 8/10 | Noll | 46—1 X |
|---|---|---|---|
| 2,167,985 | 8/39 | Levay | 273—86 |
| 2,618,888 | 11/52 | Hoff | 46—1 |

FOREIGN PATENTS

| 488,648 | 12/52 | Canada. |
| 1,145,460 | 5/57 | France. |
| 853,970 | 12/52 | Germany. |
| 781,092 | 8/57 | Great Britain. |

DELBERT B. LOWE, *Primary Examiner.*

RICHARD C. PINKHAM, *Examiner.*